May 14, 1963    Q. E. HONNERT    3,089,593
SEALED CONTAINER VACUUM DETECTING APPARATUS
Filed July 20, 1960    4 Sheets-Sheet 1

INVENTOR.
Quentin E. Honnert
BY
Howard B. Funk
ATTORNEY

May 14, 1963  Q. E. HONNERT  3,089,593
SEALED CONTAINER VACUUM DETECTING APPARATUS
Filed July 20, 1960  4 Sheets-Sheet 2

INVENTOR.
Quentin E. Honnert
BY Howard B. Funk
ATTORNEY

May 14, 1963          Q. E. HONNERT          3,089,593
SEALED CONTAINER VACUUM DETECTING APPARATUS
Filed July 20, 1960                                  4 Sheets-Sheet 3
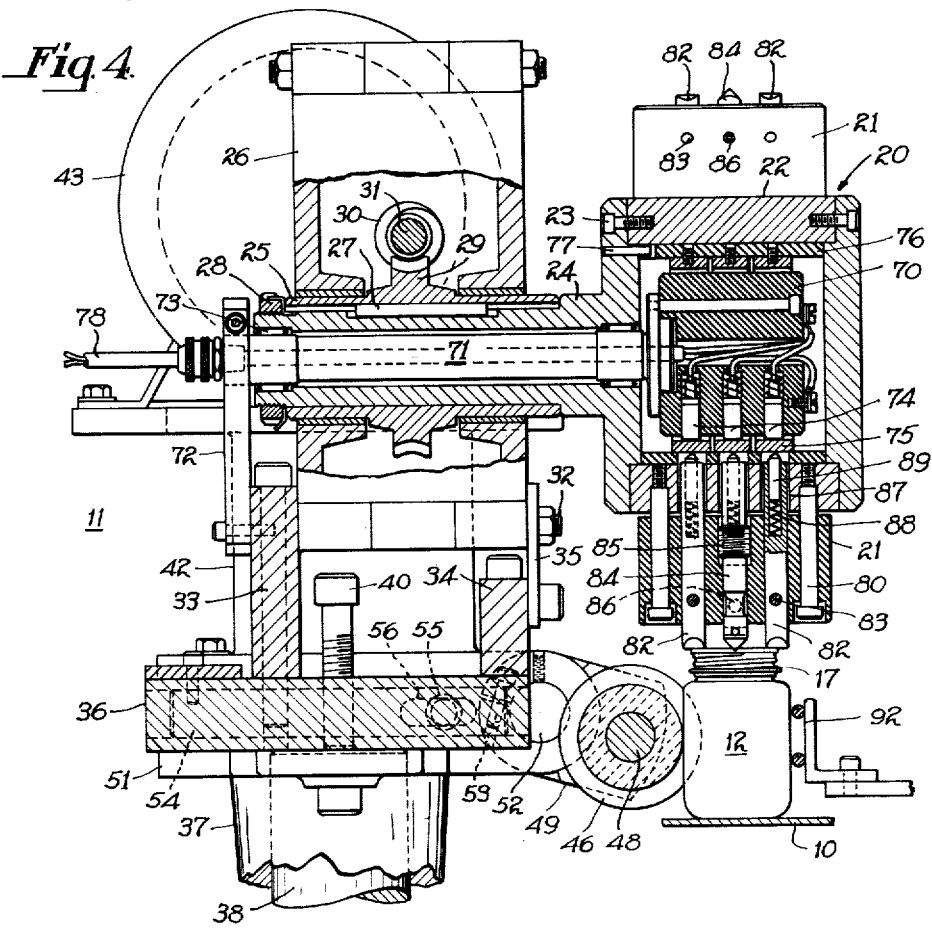
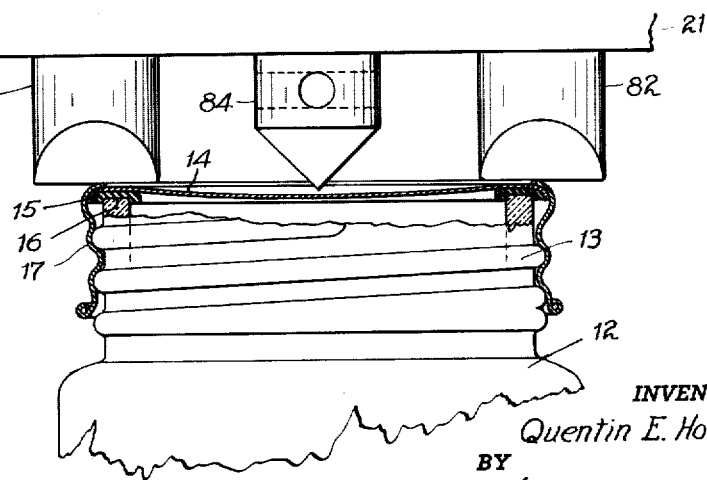
INVENTOR.
Quentin E. Honnert
BY
Howard B. Funk
ATTORNEY May 14, 1963   Q. E. HONNERT   3,089,593
SEALED CONTAINER VACUUM DETECTING APPARATUS
Filed July 20, 1960   4 Sheets-Sheet 4
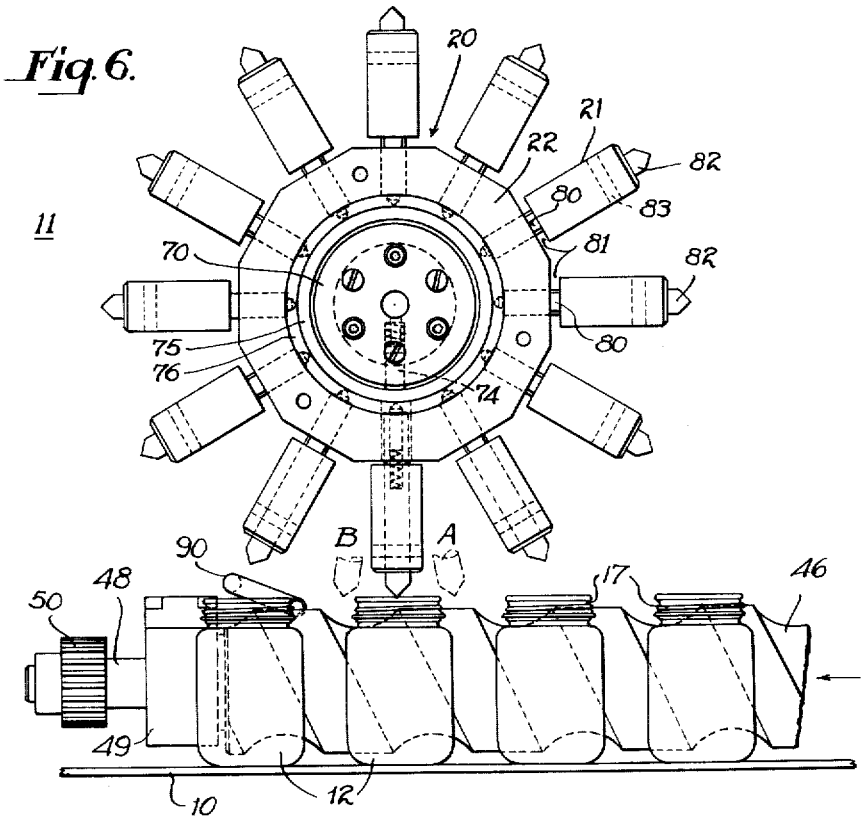
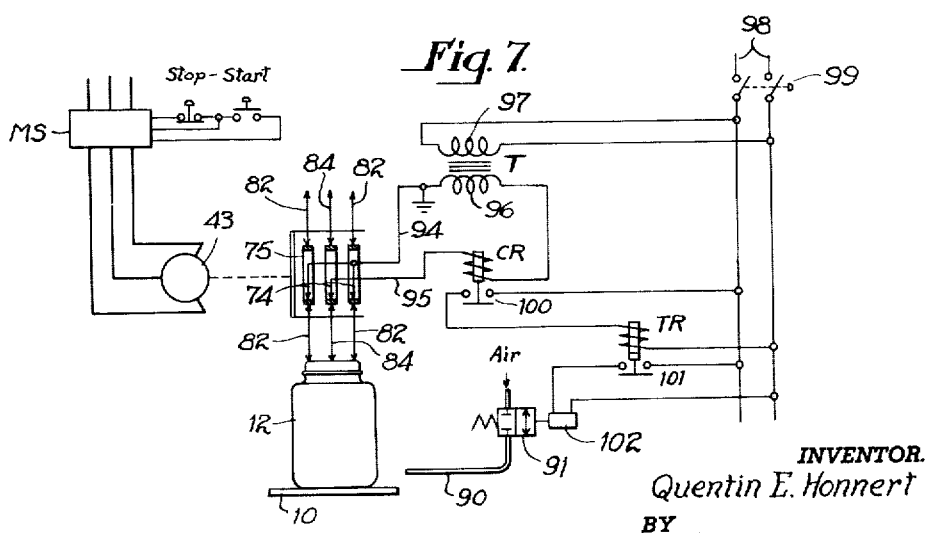
INVENTOR.
Quentin E. Honnert
BY
Howard B. Funk
ATTORNEY ized May 14, 1963

**3,089,593
SEALED CONTAINER VACUUM DETECTING
APPARATUS**
Quentin E. Honnert, Richmond, Ind., assignor to Aluminum Company of America, Pittsburgh, Pa., a corporation of Pennsylvania
Filed July 20, 1960, Ser. No. 44,045
6 Claims. (Cl. 209—82)

This invention relates to sealed container vacuum detecting apparatus and has particular reference to mechanism for testing and sorting containers or jars which have been sealed with a partial vacuum therein, so that those with deficient vacuum will be separated from those having acceptable vacuum.

It is known to vacuum pack many food products and other materials in suitable containers, extensively glass jars, and to seal the containers with flexible metal closures or caps whose normally flat top cap disc or lid portion deflects or bows inwardly under the vacuum or negative pressure condition in the sealed containers. The extent of this depression or concavity is a function of the degree of vacuum in the container and in accordance with the present invention is measured with respect to the edge of the cap to determine whether the container possesses an acceptable vacuum to assure good keeping qualities for the contents thereof. The invention in the form herein illustrated and described is particularly adapted for testing and sorting out vacuum packed jars of baby and junior foods that have been sealed with screw thread type flexible metal caps because of the advantage possessed thereby of affording easy opening of a sealed jar without cap deformation and of permitting airtight resealing of the jar for keeping unused food portions moist and tasty during refrigerator storage thereof until another feeding time. It is to be understood, however, that this is merely illustrative of the utility of the invention. In this exemplary case, and others, high speed packaging or processing lines are extensively employed for high volume production and low unit costs, and it is desired to check the sealed jars for determination of the vacuum condition therein without interfering with or slow-down in the production rate so that only those containers or jars having a predetermined minimum vacuum therein will move on past the testing station as acceptable production units.

An object of the invention is to provide an apparatus which is efficient and reliable in operation for testing sealed containers and detecting those in which the vacuum is below a prescribed limit.

Another object is to provide an apparatus capable of high speed operation for testing and sorting out from a processing line those containers or jars sealed with a flexible metal cap which do not measure up to a prescribed minimum or proper vacuum therein as determined by measurement of cap depression or concavity resulting from the vacuum.

A further object is the provision of an automatic electric vacuum detector incorporating a rotary tester arranged for cooperation with a line of progressively moving sealed jars having flexible metal sealing caps and adapted to test each jar simply by its movement under the tester and measuring cap concavity in passing.

Still another object is to provide new and improved apparatus of the character above indicated which incorporates a minimum of operating elements, is fast and reliable in operation and which incorporates effectively simple means for separating jars with vacuum sufficiently low to constitute rejects from those having minimum allowable vacuum therein to constitute acceptable production units.

Other objects and advantages of the invention, particularly in regards to features of construction and simplicity, will become apparent from consideration of the detailed description of a preferred practical embodiment thereof, as illustrated in the accompanying drawings and in which:

FIG. 4 is a transverse sectional view taken on the line IV—IV of FIG. 1;

FIG. 5 is a fragmentary sectional elevational view of approximately double full scale showing the relationship between the testing electrodes and the cap of a vacuumized jar;

FIG. 6 is an axial end view of the rotary turret and its testing heads, with its end plate removed to show its interior elements, the jar conveyor and jar spacing feed screw, with the outside jar guide rail removed, as viewed from the right hand side of FIG. 4, and FIG. 7 is a diagrammatic illustration of the testing apparatus and associated electric control.

Figure 1:
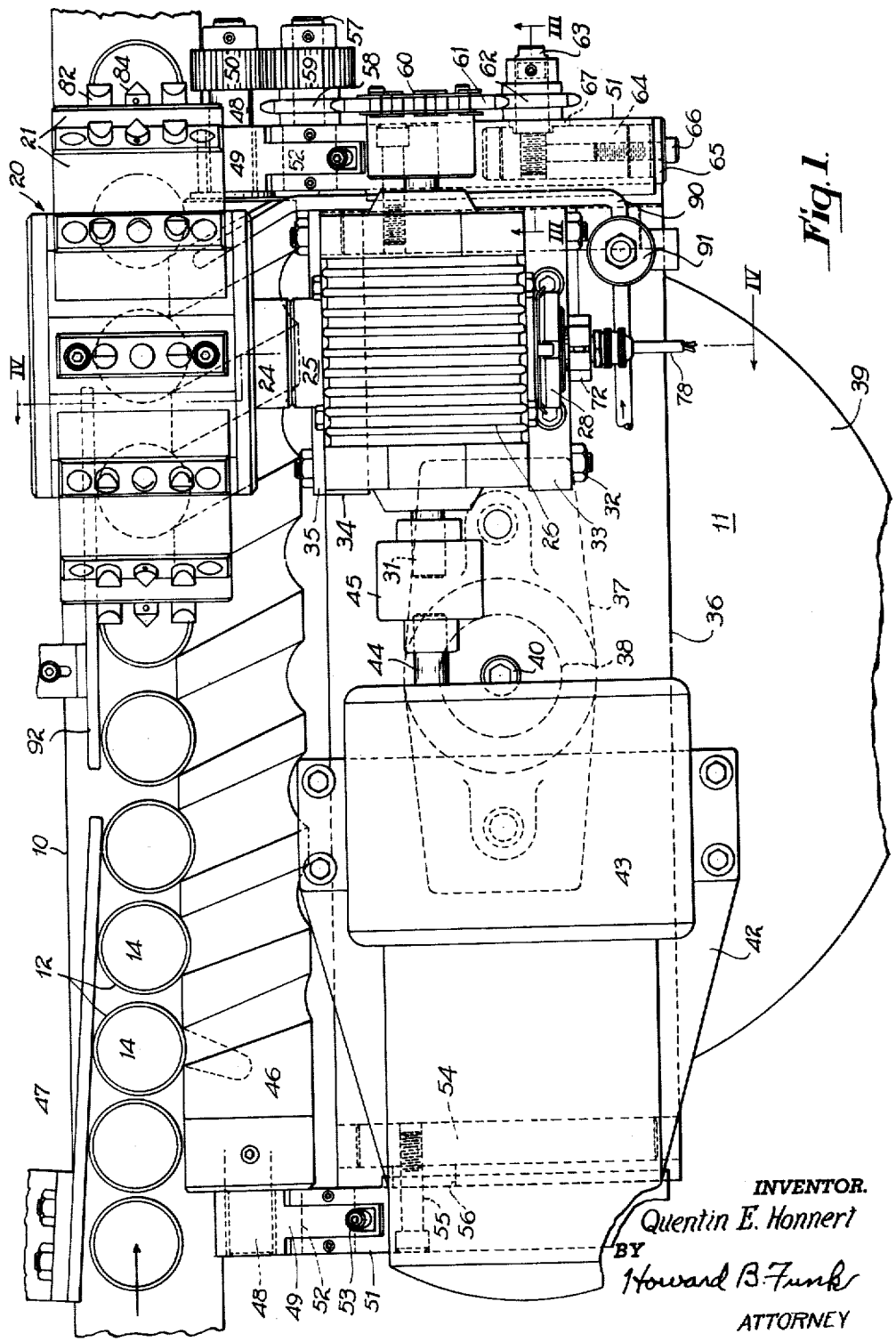
FIG. 1 is a top plan view showing the cooperative relation between a jar conveyor and jar testing apparatus embodying the invention.

Referring to the drawings, it will be seen that the apparatus of the present invention is operable to test each one of a line of vacuumized containers, herein each shown as a glass jar, supported on and moved by a conventional belt or slat type conveyer 10 which may form part of a high speed processing line, the conveyer continuously carrying the jars past a testing station whereat is disposed an automatic testing unit, indicated generally by the numeral 11, for testing each jar in passing. The conveyer belt may be supported and driven in a conventional well-known manner, not illustrated, as such details form no part of the instant invention.

As heretofore mentioned, the invention in the form herein illustrated is particularly adapted for testing baby food jars that have been sealed with screw thread type flexible metal caps. As best seen in FIG. 5, each jar 12 has its neck provided with a screw thread formation 13 and is sealed by a closure cap of thin and flexible sheet metal, preferably of two-piece construction, including a lid or cap disc 14 having a sealing ring gasket 15 which seats on the top surface or rim 16 of the jar and a screw ring 17 which holds the cap disc in sealing position on the rim of the jar. When the jar is vacuumized and sealed, the gasket 15 forms a hermetic seal between the cap and the jar and atmospheric pressure causes the flexible cap disc, which is normally flat, to deflect or bow inwardly into the mouth of the jar, as shown, to increase the effectiveness of the seal. The extent of this depression or concavity is a function of the degree of vacuum within the container or jar and with caps currently in use has been found to be as much as .060 inch, comparing or measuring the difference in elevation between the center and the edge of the cap. This concaved or depressed condition of the jar caps is checked by the testing unit and under normal operating conditions, jars with caps measuring a deflection less than a prescribed amount are immediately removed from the conveyor, as hereinafter described.

The testing unit 11 comprises a rotatable turret 20 directly above the conveyor 10 on a horizontal axis in transverse relation to the conveyor for passage of the jars under the turret, test heads or blocks 21 of insulation material and provided with projecting electrodes are equiangularly spaced about the outer periphery of the turret in radial relation thereto (like the spokes of a wheel), each to apply its electrodes to the cap of a passing jar. As shown in FIG. 6, a turret provided with twelve test heads spaced 30° apart is disclosed, but the number may be varied to suit requirements. The advantage of the twelve head turret is that the rotational speed of the turret is minimized while permitting close spacing of the jars on the conveyor for full capacity utilization of the conveyor at its normally desired rapid travel rate for high volume production of a given size jar.

The turret comprises a hollow body or shell 22 which is suitably secured, as by spaced screws 23, one of which is shown in FIG. 4, to the flanged end of a hollow shaft 24 that extends through and is supported by a hollow worm gear shaft 25 that is journalled in opposite sides of a worm gear housing 26. Shaft 24 at its outboard or flanged end has shouldered engagement with shaft 25 and the two are interconnected by means of key 27. Thrust nut 28 threaded on the other end of shaft 24 with its lock washer engages the other end of shaft 25. The two shafts are thus locked against axial separation. Shaft 25 has an integral worm gear 29 in mesh with worm 30 integral with a double end shaft 31 journalled in and extending outwardly from the ends of housing 26. The housing 26 is suitably supported as by means of through bolts 32 and side blocks 33—34, the latter having a side plate extension 35 affixed thereto, to reach the housing, the blocks upstanding from and being bolted, as shown, to a substantially rectangular base plate 36 disposed to one side of and in parallel relation lengthwise to conveyor 10. The base plate is supported by a flanged collar 37 fitted slidably on the upper end of a solid post 38 which is upstandingly supported by floor base 39, so that the test unit may be suitably secured to the floor at a desired location alongside the conveyor. In order to permit vertical adjustment of the turret above the conveyor for accommodating jar runs of different heights, a screw 40 threads down through base plate 36 and engages the center of post 38, loosening set screw 41 (FIG. 2) of collar 37 and turning screw 40 in the proper direction effecting accurate vertical adjustment of the turret with respect to the conveyor.

Supported on the top of base plate 36 is a motor base bracket 42 on which is mounted a gear-motor unit 43 whose output shaft 44 is connected by an overload safety clutch coupling 45 to the inner end of shaft 31. By this drive means, including worm gear unit in housing 26, the turret is driven independently of the conveyor and at a speed closely matching the conveyor speed by choice or selection of the reduction gearing present in the turret drive line. It is not necessary that the turret and conveyor speeds match exactly because means are provided in the form of a jar feed and spacing screw 46 for the dual purpose of making the jar spacing and jar speed coincident with that of the test heads 21 on the turret, thereby assuring proper registry between each head and jar during the testing interval.

Screw 46 is supported from base plate 36 in parallel, overlying relation to one side of conveyor 10 so as to be side-engaged by the jars advanced by the conveyor, and its extends under the turret from the entry to the exit side thereof so as to keep the engaged jars under spacing and advancement control during the testing interval. An entry guide bar 47 (FIG. 1) opposite the screw at its entry end serves to guide the jars into engagement with the screw, and these jars may be close spaced or substantially in contact as they approach the entry end of the screw. Starting near this end, the screw is provided with a jar accelerating screw groove of increasing pitch for approximately half the screw length, which groove for the remainder of the screw length is of constant or uniform pitch. Thereby, the jars are accelerated to the speed of the turret test heads and brought into spaced relation corresponding thereto for registered engagement thereby, the point of reference being the tips of the electrodes, hereinafter described, which contact the top of the jar lids.

Figure 2:
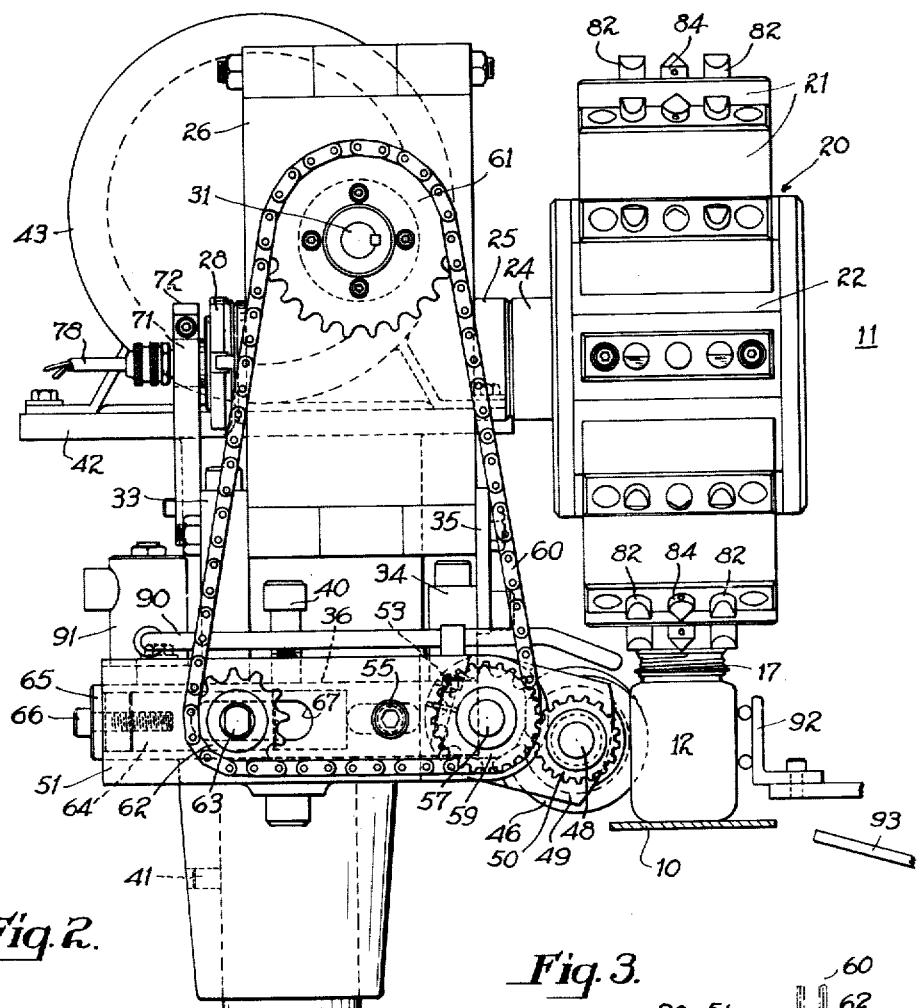
FIG. 2 is an end elevational view of the apparatus looking from the right hand side of FIG. 1.
Figure 3:
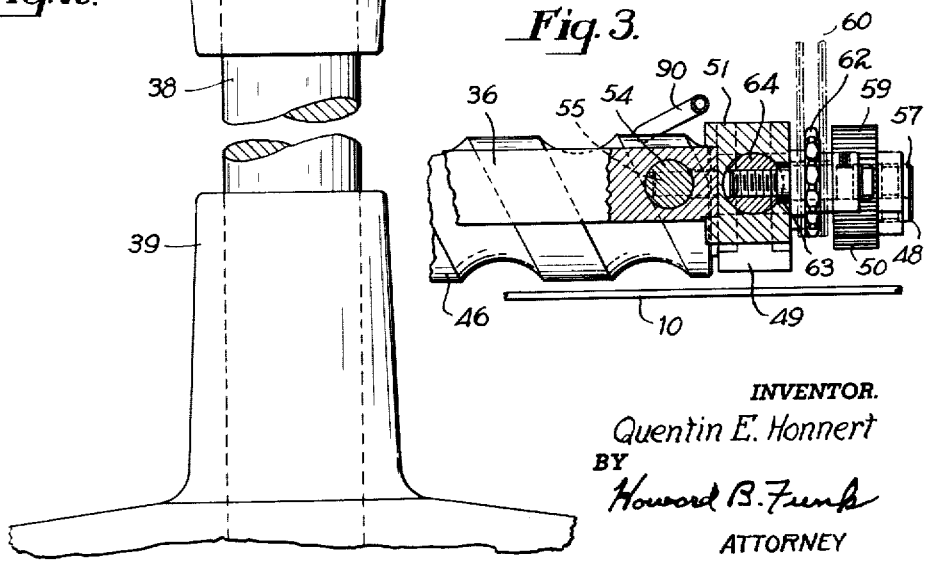
FIG. 3 is a fragmentary detail sectional view taken on the line III—III of FIG. 1.

Screw 46 is carried by through shaft 48 which is journalled at its ends in bearing blocks 49, the rear end of shaft 48, as best seen in FIG. 1, being extended to carry a gear 50 by which the shaft and the feed screw are adapted to be driven. At each end, the base plate 36 is fitted with a slide block 51 which is bifurcated at its inner end and carries a fixed pin 52. Each bearing block 49 is formed with a reduced width tail portion which fits between the bifurcated end of a slide block 51 and is adapted to be clamped to the pin 52 thereof by means of a clamp screw 53, the tail portion being split, as shown in FIGS. 2 and 4, to permit the clamping action by the screw 53. This pivotal mounting of the bearing blocks on the pins 52 permits vertical arcuate adjustment of the feed screw 46 with respect to the jars on the conveyer 10. Also, the feed screw may be adjusted in directions transverse to the conveyor to accommodate jars of different diameter by shifting the slide blocks 51. To permit such adjustment, the base plate is transversely drilled through adjacent each end and in each such bore an elongated slide pin 54 is fitted. Each slide block has a clamp bolt 55 which passes through an elongated slot 56 in the intervening wall of the bore and threads into the pin 54, such bolt when tight serving to hold the slide block 51 and slide pin 54 in clamped relation to the base plate.

The pin 52 in the slide block at the drive end of shaft 48 is formed with a stub shaft 57 on which is rotatably mounted a sprocket 58 and a gear 59 which meshes with gear 50. A drive chain 60 passes around sprocket 58, up around drive sprocket 61 keyed on the outer end of shaft 31 and down around take-up sprocket 62 mounted on stub shaft 63 whose inner end thread-locks into a pin 64 slidably fitted in a short bore formed in the outer end of slide block 51. A cap washer 65 closes the outer end of the bore and a screw 66 extending therethrough threads into the pin 64 and enables the pin and stub shaft and sprocket to be adjusted outwardly to take up slack in the drive chain, elongated slot 67 in the intervening wall of the bore permitting this adjusting movement of the parts. By means of this feed screw driving mechanism, such screw is driven in fixed relationship to the rotation of the turret for accurate spacing and registry of the jars with the test head electrodes on the turret.

Within the turret, as shown in FIG. 4, there is provided a fixed or stationary annular brush holder 70 of insulating material which is bolted co-axially of shell 22 to the flanged end of a fixed shaft 71 extending through shaft 24 and held against rotation and axial shifting by means of clamp plate 72 which clampingly receives the shaft and is secured to the block 33. Shaft 71 is supported by shaft 24 through interposed antifriction bearings 73, as indicated. Brush holder 70 carries three spring pressed carbon brushes 74, each of which bears against an annular collector ring 75 of conductor material, each brush and its collector ring being spaced from the others to avoid electrical short circuiting therebetween. The rings 75 are secured to an insulating spacer sleeve 76 lining the inner surface of shell 22 and secured thereto, as by means of pin 77, so that the sleeve and the rings rotate with the shell around the stationary brush holder. Conductor wires extending from the two outer brushes may be connected to suitable terminal screws to which one conductor of a two conductor electric cable 78 is connected, while the conductor wire from the center brush may be connected to another terminal screw to which the other conductor of the cable is connected. Cable 78 passes through a bore in the fixed shaf 71 and electrically connects the test heads with the control means hereinafter described.

Referring to FIGS. 4 and 6, it will be seen that each test head 21 is slidably supported on a pair of shoulder bolts 80 that are threaded into shell 22 and has limited sliding movement thereon to an outer position with respect to the axis of the shell or turret limited by its engagement with the bolt heads. In this outer position, each head has a fixed clearance distance or gap 81 between it and the shell 22. The advantage of this feature of construction is that it takes care of the ever present tolerance variation in jar heights by allowing retraction of the test heads with respect to the turret thereby eliminating the possibility of causing chip damage or even breakage of a high jar during the testing interval. The respective heads 21 are normally yieldingly held in this outer position by dual purpose springs carried by their electrodes.

With respect to such electrodes, each head has three of them extending radially therethrough and in line between the supporting bolts. The two outer electrodes 82 are held in fixed relation in the head by means of pins 83 and project outwardly therefrom to the same extent. They are spaced apart such distance as to engage the edge of the cap of a jar under test at diametrically opposite points, and each has a chisel point end, as shown, in order to assure making good electrical contact with the cap. The center electrode 84 is adjustably mounted in the head, it being formed with an enlargement 85 provided with fine screw threads engaging a threaded counterbore in the inner side of the head and being held in fixed position of adjustment by means of set screws 86 engaging opposite sides of an undercut portion of the electrode, as shown. Small diameter crossed bores are provided in the outer exposed end of the electrode, or it may be otherwise formed with wrench surfaces, to facilitate it being turned for axial adjustment. The electrode 84 is formed with a conical outer end, the tip of which is a sharp point, as has been found necessary in order to discriminate accurately between borderline jars which are close to being good or bad, so as to make electrical contact and thus detect only those jars whose cap depression is less than the allowable minimum. The center or detecting electrode of each test head is adjusted to a preset position past its outer electrodes (see FIG. 5), the desired setting being determined by the minimum deflection (e.g. vacuum) allowable. The center of the cap is always compared to the edge and, for example, if .031" is selected as the minimum amount or distance the center may be below the edge, as the prescribed limit, the detecting electrodes are preset to this point, as by use of a gage provided for the purpose. Then, in operation, if the cap center is this amount or more below the edge, the jar is allowed to stay on the conveyer. If the center is less than this amount, the tip of the detecting electrode touches and completes a test circuit through the center of the cap to activate means that removes this jar from the conveyer. One outer comparing electrode might be used, in some cases, but for small jars, as shown, two are preferred as thereby the possibility of a jar being upset on the conveyer during the test interval is eliminated.

The three electrodes of each head extend into clearance bores 87 in the shell 22 (FIG. 4), to prevent electrical short-circuiting, and each electrode is provided with a blind axial bore in which is disposed a spring 88 and a slidable contact pin 89. The pointed end of the respective pins make electrical contact with the respective collector rings 75. Springs 88 not only urge the contact pins into engagement with the collector rings, but serve collectively to resiliently maintain the test head 21 in its normal outer position, thereby avoiding the need and expense of providing other head biasing springs and making the structure more simple and compact.

Referring to FIGS. 1 and 2, the means for removing or ejecting a rejected jar from the conveyer advantageously simply comprises a blast tube 90 and a normally closed, solenoid operated air valve and suitably mounted on base plate 36 and controlling flow of compressed air from a supply source (not shown) to the tube. The tube terminates adjacent to and directs the air blast generally transversely of the conveyer at the exit side of the turret. Opposite the blast or ejection point, a gap is provided in the usual jar side guide rail 92 to permit jar ejectment from the conveyer and the discharged jars may move down a suitable inclined chute 93, as indicated in FIG. 2. Due to height tolerance variation of the jars, the arc of travel of the comparing electrodes in contact with the cap of a jar undergoing test, as from A to B in FIG. 6, may vary from about 11.5 degrees of rotation of the turret to about 25.8 degrees for the exemplary jars illustrated, so the blast tube end is normally located just beyond the release point B of the maximum height jar.

Referring now to FIG. 7, the drive motor 43 is connected for energization from a suitable voltage supply source (three phase as shown) through a usual magnetic starter MS having the usual stop-start push switch control. Wires 94 and 95 constitute the two conductors of cable 78 coming from the turret. All the comparing electrodes 82 are connected together electrically to wire 94 through the outer collector rings 75 and their brushes 74, while all the center or detecting electrodes 84 are similarly connected through the center collector ring and its brush to wire 95. Thus, the electrodes of each test head constitutes a series test circuit for checking each jar for the presence of cap deflection or concavity resulting from vacuum in the jar. In series in this circuit is the coil of a control relay CR and the secondary winding 96 of a step-down transformer T whose primary 97 is connected for energization from an A.C. supply source, represented by conductors 98, of say 110 volts, through an on-off switch 99. A low voltage of say 24 volts may be supplied to the test circuit and one side may be grounded as shown.

In operation, since the feed screw 46 advances the jars into spaced relation registering with the successive test heads 21 on the turret, the comparing electrodes 82 of a test head come into diametral edge contact with the top of the cap of a jar at approximately point A, FIG. 6. During the conjoint jar and head movement to a point directly aligned under the axis of the turret (the midpoint between A and B) the head resiliently recedes towards the turret axis due to the action of the biasing springs 88, so that no damaging pressure is imposed on the passing jar. Since the center or detecting electrode 84 has a preset axial advance position relative to the edge electrodes 82, as shown in FIG. 5, its pointed tip may or may not contact the center of the cap depending on the deflection, or concavity of the cap. If this cap depression is greater than the allowable minimum (.031 inch) the tip of the detecting electrode will not touch the center of the cap and such jar remains on the conveyer for transport thereby to a desired point.

In case the cap depression is equal to or less than the allowable minimum, the tip of electrode 84 touches the center of the cap and thereby completes the test circuit through the cap, responsively to which control relay CR energizes. Normally open contacts 100 of this relay are connected in series with the coil of a timing relay TR across the 110 volt supply circuit. Normally open contacts 101 of timing relay TR are connected in series with solenoid 102 of air valve 91 across the supply circuit. Therefore, control relay CR and timing relay TR are energized whenever the test circuit is completed, as is the air valve solenoid, so that a blast of air is directed toward the jar under test. So long as the cap is in contact with the outer comparing electrodes, such jar cannot be ejected by the air blast, due to the spring loading of such electrodes bearing down on the cap.

At the instant the detecting electrode tip no longer makes contact with the cap, the test circuit is no longer completed and relay CR deenergizes which, in turn, deenergized timing relay TR. Contacts 101 of TR, however, do not return to normally open position, since they are adjusted to remain closed for a short time interval. This time interval is made sufficient to allow valve 91 to say open long enough so that the defective jar will be blown off the conveyer once it is released or no longer held down by the outer electrodes 82. In addition, the time interval is set to expire and allow air valve 91 to close so as to shut off the air blast before the electrodes of the next test head come into contact with the cap of the succeeding jar. Thereby, only those jars whose cap depression and hence internal vacuum is less than the prescribed limit are ejected from the conveyer.

It is thought that the invention and its many attendant advantages have been brought out and will be understood from the foregoing description, and it will be apparent that various changes and modifications may be made in the form, construction and arrangement of the parts within the spirit and scope of the invention as set forth in the following claims.

What is claimed is:

1. Apparatus for determining the degree of vacuum in sealed containers moving in a single file, upright position past a test point and having a flexible metal end sealing closure which bows inwardly under vacuum in the containers, said apparatus comprising a turret rotatably mounted on a horizontal axis directly above and in transverse relation to the travel path of said containers, a plurality of equi-angularly spaced test heads slidably carried by said turret in outwardly spaced radiating relation thereto, spring means resiliently urging said heads outwardly for retraction towards the turret in testing successive containers passing thereunder, electrode means rigidly mounted in and radially projecting from each of said heads and comprising a closure-edge contact point and a sharply tipped closure-centered contact point, the latter being in preset projecting relation to the former and both being in line with the axis of said turret for cooperative engagement with the sealing closure on a container passing thereunder to establish an electric test circuit through said closure if its concavity is less than a prescribed amount, ejector means disposed at the exit side of said turret substantially at the point of electrode disengagement from a tested container for effecting lateral displacement of defective containers from said travel path, each after its release by a test head, electrically actuated operating means for said ejecting means, and control switch means including timing means connected in and controlled by said test circuit for actuating said ejector operating means and maintaining the same in actuated condition for a predetermined interval after said test circuit is opened.

2. Apparatus for determining the degree of vacuum in sealed containers moving in single file, upright position past a test point and having a flexible metal end sealing closure which bows inwardly under vacuum in the containers, said apparatus comprising a rotatable turret overlying the travel path of said containers on a horizontal axis disposed transversely of said travel path, a plurality of equi-angularly spaced test heads slidably carried by said turret in outwardly spaced radiating relation thereto, spring means urging said heads outwardly for retraction toward said turret in testing successive containers passing thereunder, a plurality of electrodes rigidly mounted in and projecting radially from each test head positioned on a line parallel to the axis of said turret for engaging the edge of the center, respectively, of the closure of a container under test and establish an electric test circuit through said closure if its concavity is less than a prescribed amount, said center engaging electrode being extended past said edge engaging electrode by said prescribed amount and having a sharply pointed tip, an air blast tube terminating adjacent the exit side of said turret substantially at the point of electrode disengagement from a tested container for effecting lateral discharge of defective containers from said travel path, each after its release by a test head, a normally closed, solenoid operated valve controlling flow of compressed air through said tube, and control switch means including timing means connected in and controlled by said test circuit for energizing the solenoid of said valve and keeping it energized for discharge of air from said tube for a predetermined interval after said test circuit is opened.

3. Apparatus for testing vacuumized jars sealed with flexible metal closure caps which bow inwardly under vacuum in the jars, comprising a rotatable turret disposed on a horizontal axis, a conveyer for travelling such jars in upright position under said turret, a plurality of equi-angularly spaced test heads slidably carried by said turret in outwardly spaced radiating relation thereto, spring means resiliently urging said heads outwardly for retraction toward the turret in testing successive jars, a plurality of electrodes rigidly mounted in and projecting radially from each test head positioned on a line parallel to said turret axis to engage the edge and the center, respectively, of a jar cap under test and establish a test circuit through such cap under test concavity is less than a prescribed amount, said cap-center engaging electrode extending past said cap-edge engaging electrode by said prescribed amount and having a sharply pointed tip, feed screw means paralleling said conveyer at one side thereof for advancing said jars relatively to said conveyer, common drive means for rotating said turret and said feed screw means in fixed relationship for spacing and registry of said jars with the successive test head electrodes, an air blast tube terminating adjacent the exit side of said turret substantially at the point of electrode disengagement from a tested jar for effecting lateral discharge of defective jars from said conveyer, each after its release by a test head, a normally closed, solenoid operated valve controlling flow of compressed air through said tube, and control switch means including timing means connected in and controlled by said test circuit for energizing the solenoid of said valve and keeping it energized for a predetermined interval after said test circuit is opened.

4. The apparatus as defined in claim 3, wherein each said test head has two such cap-edge engaging electrodes, each having a chisel point end in a common plane, for contacting the edge of the jar cap at diametrically opposite points, and each said cap-center engaging electrode having threaded engagement with its test head for axial adjustment therein with respect to said cap-edge engaging electrodes, and means for locking said adjustable electrode in its adjusted position.

5. Apparatus for testing and sorting vacuumized jars sealed with flexible metal closure caps which bow inwardly under vacuum in the jars, comprising a rotatable turret disposed on a horizontal axis and having a hollow body, a hollow-shaft supporting said turret, means for travelling such jars in single file, spaced, upright position under said turret, a plurality of equi-angularly spaced pairs of spaced apart shoulder bolts radiating from said body, each pair in line parallel to said turret axis, test heads, each slidably supported on a pair of said bolts and uniformly spaced outwardly from said body, three radial electrodes fixedly carried by each test head in line with and between said bolts in position to contact the edge diametrically and the center, respectively, of a jar cap under test and establish a test circuit through said cap if its concavity is less than a prescribed amount, the center electrode having a sharply pointed tip and extending past said edge-contacitng electrodes by said prescribed amount, three collector rings insulatedly mounted in said turret body opposite the respective electrodes, a brush holder encircled by said rings and carrying spring-pressed brushes bearing on said rings, said holder supported by a fixed member extending through said hollow shaft, along with a two-conductor electric cable having one conductor electrically connected to the center collector ring through its brush and the other conductor electrically connected to the outer collector rings through their brushes, each electrode of each head being provided at its inner end with a biasing spring and a relatively movable member in electrical contact with the collector ring opposite thereto, said springs collectively yieldingly maintaining said head in its said outwardly spaced position, whereby said heads accommodate the variations in jar heights, drive means coupled to said shaft for rotating said turret at a speed which brings the outer electrodes of successive heads into diametrical contact with the caps of successive jars, electrically actuated ejector means disposed at the exit side of said turret substantially at the point of electrode disengagement from a tested jar for displacing defective jars laterally from said travel path, each after its release by a test head, said test circuit extending through said cable to control switch means operable responsively to completion of said test circuit for operating said ejecting means, and timing means included with said control switch means for maintaining said ejector means in operated condition for a predetermined interval after said test circuit is opened.

6. Apparatus as defined in claim 5, wherein said ejector means comprises an air blast tube having its discharge end disposed to blow air substantially transversely across said jar travel path for displacing the defective jars therefrom, a source of compressed air for discharge from said tube, and a normally closed, solenoid operated valve controlling flow of air from said source through said tube.

References Cited in the file of this patent
UNITED STATES PATENTS

| | | |
|---|---|---|
| 1,766,019 | Garrett | June 24, 1930 |
| 2,093,429 | Foss | Sept. 21, 1937 |
| 2,907,457 | Simpson | Oct. 6, 1957 |
| 2,936,071 | Fauth | May 10, 1960 |
| 2,960,223 | Fauth | Nov. 15, 1960 |

UNITED STATES PATENT OFFICE
CERTIFICATE OF CORRECTION

Patent No. 3,089,593                          May 14, 1963

Quentin E. Honnert

It is hereby certified that error appears in the above numbered patent requiring correction and that the said Letters Patent should read as corrected below.

Column 4, line 66, for "shaf" read -- shaft --; column 6, lines 18 and 19, for "constitutes" read -- constitute --; line 70, for "say" read -- stay --; column 7, line 26, for "closure-centered" read -- closure-center --; line 57, for "of", first occurrence, read -- and --; column 8, line 12, for "under test" read -- if its --; line 57, for "edge-contacitng" read -- edge-contacting --; line 75, for "diametrical" read -- diametral --.

Signed and sealed this 26th day of November 1963.

(SEAL)
Attest:
ERNEST W. SWIDER

Attesting Officer

EDWIN L. REYNOLDS

Acting Commissioner of Patents